A. F. SPAWN.
APPARATUS FOR DRYING ALIMENTARY AND OTHER SUBSTANCES.
APPLICATION FILED NOV. 27, 1918.
1,318,931.
Patented Oct. 14, 1919.
2 SHEETS—SHEET 1.
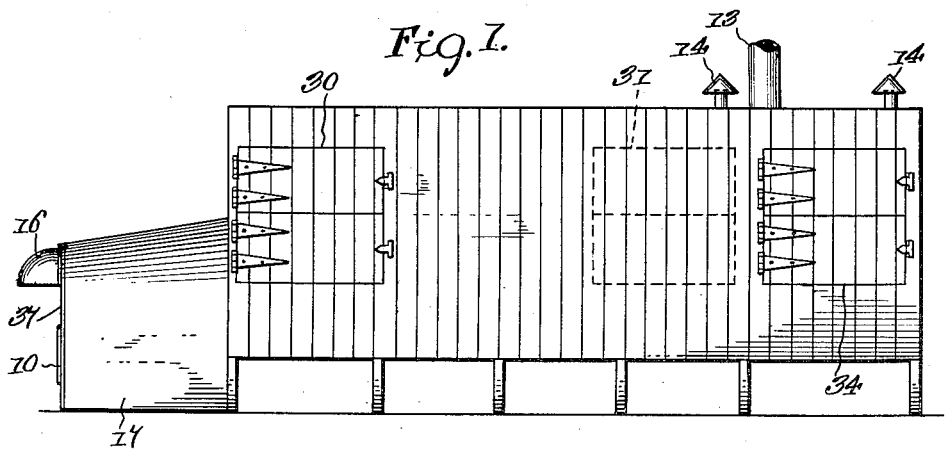
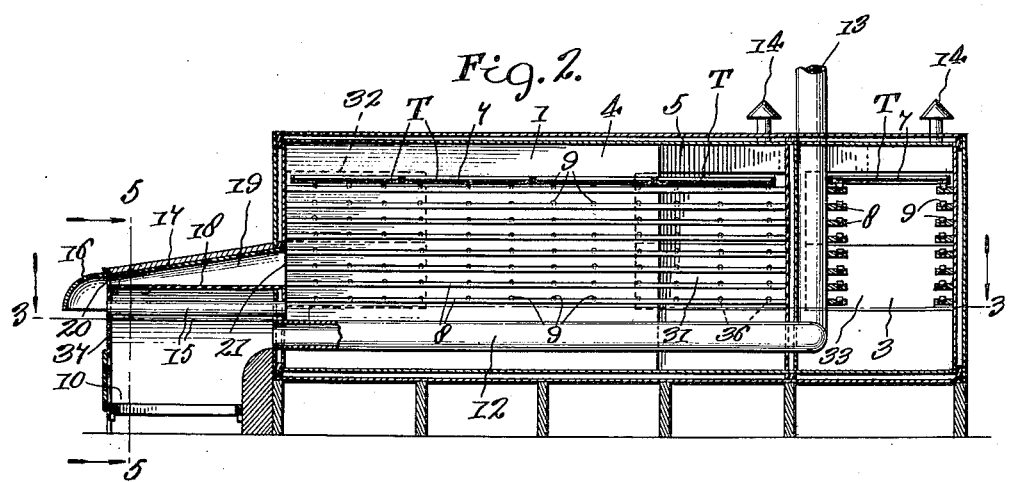
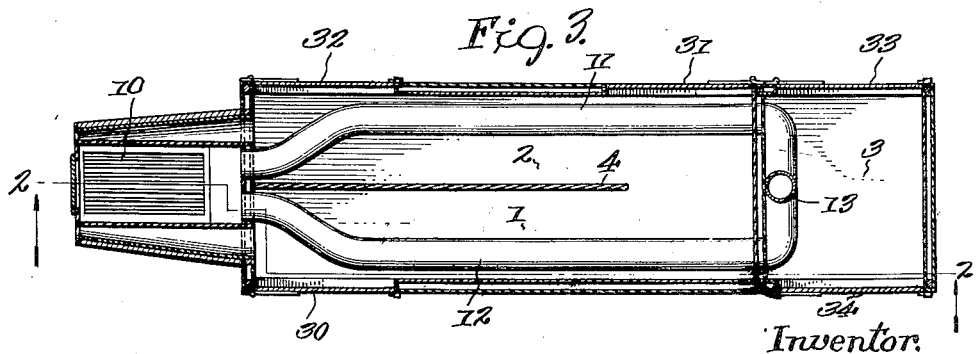
Inventor.
Abel F. Spawn.
by Wilkinson & Ginsta,
Attorneys.

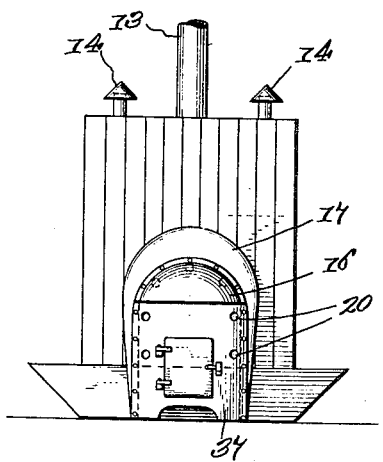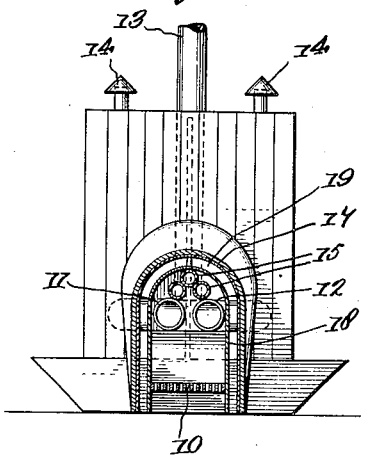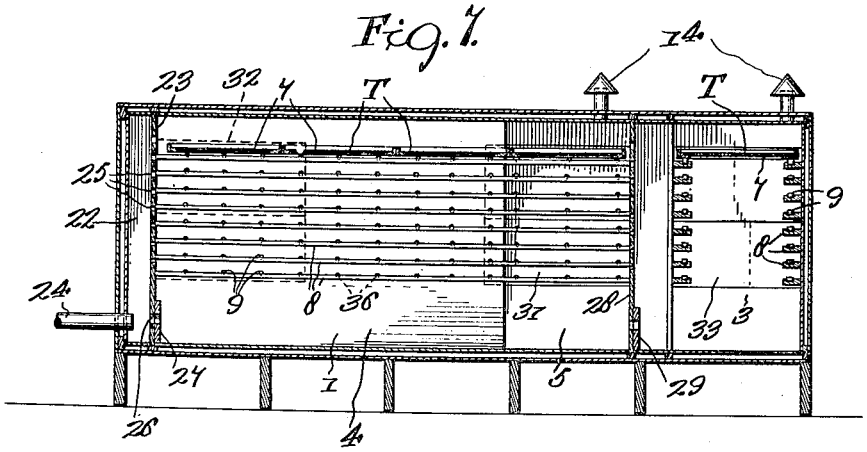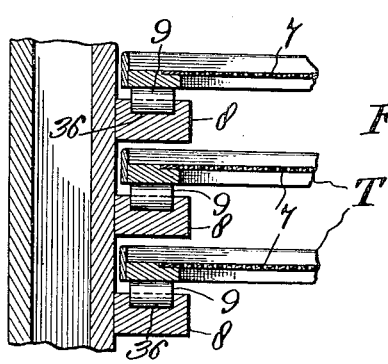

UNITED STATES PATENT OFFICE.

ABEL FRENCH SPAWN, OF LOS ANGELES, CALIFORNIA.

APPARATUS FOR DRYING ALIMENTARY AND OTHER SUBSTANCES.

1,318,931.       Specification of Letters Patent.       Patented Oct. 14, 1919.

Application filed November 27, 1918. Serial No. 264,367.

*To all whom it may concern:*

Be it known that I, ABEL FRENCH SPAWN, of Los Angeles, California, residing at Los Angeles, in the State of California, U. S. A., have invented certain new and useful Improvements in Apparatus for Drying Alimentary and other Substances; and I do hereby declare the following to be a full, clear, and exact description of the invention, such as will enable others skilled in the art to which it appertains to make and use the same.

My invention relates to improvements in drying apparatus in which fruit, vegetables or the like may be quickly dried without removing the natural flavor from the same, and the object of my invention is to provide a drying apparatus which shall be constructed in such manner that the fruit may be placed therein and a greater portion of the heat supplied to the apparatus will pass over the top surface of said fruit and be carried away together with the moisture arising from the fruit before the heated moist air rises and permeates the adjacent fruit.

A further object of my invention is to provide novel means whereby trays of fruit may have the bulk of the moisture removed in one compartment of the drying chamber and then be moved to another compartment of said drying chamber where a large proportion of the remaining moisture is removed in the same manner and if it is found that the desired amount of moisture has not been removed in said last named compartment the trays of fruit are then placed in a third or auxiliary compartment wherein the process of drying is completed.

Heretofore in drying fruits, vegetables and the like it has been customary to arrange trays of fruit one above the other in a drier and to introduce heated air at the bottom and allow it to pass upwardly through the fruit thereby partially cooking the same and exhaust the air at the top of the drier. In drying fruit in this manner it has been found that the moist heated air in permeating upwardly through the fruit removes and carries away a large portion of the rich natural flavor of the fruit and that the fruit does not dry evenly in all parts of the drier.

My invention obviates this difficulty by providing a drier wherein a large part of the heated air passes over the top of the filled trays and is not permitted to permeate upwardly through the fruit in successive trays above, thereby drying all the fruit evenly and quickly and at the same time conserving the rich natural flavor of the fruit.

A convenient form of the invention is depicted by the accompanying drawings in which—

Figure 1 is a side elevation of the apparatus;

Fig. 2 a longitudinal vertical section taken on the line 2—2 in Fig. 3;

Fig. 3 a horizontal section taken on the line 3—3 in Fig. 2.

Fig. 4 is a front elevation.

Fig. 5 is a transverse vertical sectional view through the fire box taken on the line 5—5 in Fig. 2.

Fig. 6 is an enlarged detail illustrating one convenient form of support for the trays.

Fig. 7 is a fragmentary longitudinal vertical section showing the construction when the apparatus is heated by a blast of hot air.

By reference to these drawings it will be seen that the apparatus comprises a main chamber divided longitudinally into two compartments 1, 2 by a vertical partition 4 which, at its end remote from the end of the chamber at which the air is introduced, is provided with an opening 5 sufficiently wide to enable the trays T, supporting the elements to be dried, to be drawn from compartment 1 to compartment 2.

At the end of this main chamber is a final drying compartment or annex 3 which may be isolated from the main chamber or connected therewith and the walls of said compartments are hollow or packed with insulating material.

The chambers are provided with doors 30, 31, 32, 33 and 34 through which the trays are fed into and withdrawn from said chambers.

The trays T preferably consist of frames (Fig. 6) provided preferably with perforated bottoms 7 made of plaited cane for instance and are supported on superposed slides 8 spaced suitably apart which may have rollers 9 seated in recesses 36 in said slides as in Fig. 6.

If a furnace 10 is attached to the apparatus it is preferably located at one end and the flue is divided into two branches or conduits 11, 12 which respectively pass longitudinally along the bottom through the chambers 1, 2 and join an outlet branch or conduit 13 which passes vertically through the chamber 3.

The radiating heat from the flue heats the air in the chambers and so evaporates the moisture from the products on the trays, said moist air being exhausted through vents 14 in the roof of the chambers.

Fresh air is admitted into the main compartments 1, 2 by means of pipes 15 passing through the upper portion of the furnace said air being heated in transit. By preference the induct ends of said pipes are protected by a curved cover or peak 16. If necessary a suction fan can be connected to the top of the drying chamber for assisting circulation and withdrawal of the heated air.

The furnace is also preferably shrouded by a hood 17 suitably lagged which is spaced apart from the furnace cover 18 and preferably flared as illustrated so that the provision is made for expansion of the air in the hollow space 19. The front or crown sheet 37 of the furnace is provided with apertures 20 communicating with the hollow space 19 and on entering said apertures 20 the air is heated and passes through openings 21 in the front end walls of the compartments 1, 2, and supplies thereto additional heated air.

Fig. 7 illustrates the slight variation in the apparatus when the heated air is supplied from a blast furnace and in this case the furnace flues and air delivery means shown in the form just described are dispensed with and an additional compartment 22 formed by a transverse vertical partition 23 is provided at the heat delivery end of the main chamber.

The blast of heated air is fed by a pipe 24 into compartment 22 and passes through apertures 25 formed in the partition 23 and located between the series of trays and by preference the apertures of each successive row from the bottom upwardly increase in area, the object being to insure a uniformity in the distribution of heat throughout the compartments.

The partition may moreover be provided with a series of air delivery ports 26 controlled by a perforated slide 27 for regulating the delivery of heated air into the lower portion of the main compartments 1, 2 and also into the final annex compartment 3 if desired in which case similar apertures would be provided in the partition 28 (Fig. 7) and regulated by a slide 29 indicated in said figure.

The partition 28 is provided with perforations, as shown in Fig. 7, of gradually increasing size from bottom to top, which correspond to the perforations 25 in the partition 23.

In operation the trays of products to be dried are fed into doors 30 and slid along till compartment 1 is filled and while in this compartment about 40 to 50 per cent. of the moisture in the products is exhausted. Doors 31 are then opened and the trays drawn forward past the end of partition 4 and slid along till compartment 2 is filled and it will be noted that the trays previously remote from the end adjacent the furnace are now nearest the latter. The products on the trays are now subjected to approximately the same degree of heat as in compartment 1 but with the important difference that there is only a comparatively small amount of moisture left in the products to be evaporated.

If the products are satisfactorily dried the trays containing same are removed through doors 32 and if a small proportion of moisture still remains the trays are passed through doors 33 into the annex 3 and finally withdrawn through doors 34, this latter compartment 3 being heated by the upright portion 13 of the flue, or by heated air delivered into said compartment.

It is to be understood that the process of drying is continuous and that as soon as the trays in compartment 1 are passed into compartment 2, compartment 1 is filled with a further supply of trays.

Furthermore it is found in practice that after the trays have remained the usual period in compartment 1, the products have shrunk to such a degree that before the trays are slid along compartment 2 the contents of two trays may be placed on a single tray, in which case the empty trays are withdrawn through doors 31 and refilled with fresh products for insertion through door 30 into compartment 1 again.

A large amount of the heat that enters the compartments 1 and 2 will pass lengthwise thereof between the tiers of trays so that the fruit will be quickly dried without the moist air permeating the fruit to any great extent thereby conserving the rich natural flavor of the fruit.

Having now fully described and ascertained my said invention, and the manner in which it is to be performed I declare that what I claim is:—

1. A drying apparatus comprising a housing, a furnace disposed at one end of said housing for supplying heated air thereto, branch flues connected with said furnace and extending lengthwise through the lower portion of said housing, a vertical partition wall dividing the interior of said housing into two main compartments that are connected at their ends remote from said furnace, one of said flues being disposed in the lower portion of each compartment, and trackways arranged one above the other in spaced apart relation on the side walls of said compartments for supporting tiers of drying trays.

2. A drying apparatus comprising a housing, a furnace disposed at one end of said housing for supplying heated air thereto, a vertical partition wall dividing the interior of said housing into two main compartments that communicate with each other at the end remote from said furnace, an auxiliary compartment provided at the end of said housing opposite said furnace and separated from said main compartments, and means on the side walls of said compartments for supporting trays arranged in tiers and spaced one above the other.

3. A drying apparatus comprising a housing, a furnace disposed at one end of said housing for supplying heated air thereto, branch flues connected with said furnace and extending lengthwise through the lower portion of said housing, a vertical partition wall dividing the interior of said housing into two main compartments that are connected at their end remote from said furnace, one of said flues being disposed in the lower portion of each compartment, an auxiliary compartment provided at the end of said housing opposite said furnace, a flue connected with said branch flues and passing upwardly through said auxiliary compartment, doors in the sides of said housing affording access to all of said compartments, and trackways arranged one above the other in spaced apart relation on the side walls of said compartments for supporting tiers of drying trays.

4. A drying apparatus comprising a housing, a furnace disposed at one end of said housing, flues connected with said furnace and extending lengthwise through the lower portion of said housing, and pipes communicating at one end with the atmosphere and at the other end with the interior of said drying apparatus and extending through the heated area of said furnace.

5. A drying apparatus comprising a housing, a vertical partition wall dividing said housing into two main compartments, said partition wall stopping short of one end of said housing to afford an opening between said compartments, a furnace located at the end of said housing, flues connected with said furnace and extending lengthwise along the bottoms of said compartments, pipes extending through the heated area of said furnace and establishing communication between the non-connected ends of said compartments and the atmosphere, and a hood surrounding said furnace in spaced apart relation to leave a heating chamber that communicates at one end with said compartments and at the opposite end with the atmosphere.

6. A drying apparatus comprising a housing, a vertical partition dividing the housing into two chambers, said partition having a passageway at one end setting up communication between said chambers, an auxiliary chamber, shelves to slidingly support trays arranged in said chambers, and heating means for said chambers, substantially as described.

In testimony whereof, I do affix my signature.

ABEL FRENCH SPAWN.